United States Patent
Eklof

(10) Patent No.: US 6,308,050 B1
(45) Date of Patent: Oct. 23, 2001

(54) DUAL BAND MOBILE PHONE USING THE SAME INTERMEDIATE FREQUENCY FOR BOTH BANDS

(75) Inventor: Anders Eklof, Poolesville, MD (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/256,628

(22) Filed: Feb. 23, 1999

Related U.S. Application Data

(60) Provisional application No. 60/078,987, filed on Mar. 23, 1998.

(51) Int. Cl.[7] ............................... H04B 1/40; H04M 1/00
(52) U.S. Cl. .......................... 455/76; 455/553; 455/260; 455/87; 455/315
(58) Field of Search ............................... 455/76, 553, 255, 455/256, 257, 258, 259, 260, 87, 86, 84, 75, 552, 313, 315, 85

(56) References Cited

U.S. PATENT DOCUMENTS

| | | | |
|---|---|---|---|
| 5,732,330 | * 3/1998 | Anderson et al. | 455/76 |
| 5,890,051 | * 3/1999 | Schlang et al. | 455/76 |
| 5,963,852 | * 10/1999 | Schlang et al. | 455/76 |
| 5,974,302 | * 10/1999 | Adamiecki et al. | 455/76 |
| 5,974,305 | * 10/1999 | Matero | 455/86 |
| 6,061,575 | * 5/2000 | Lombardi | 455/552 |

* cited by examiner

Primary Examiner—William Trost
Assistant Examiner—Rafael Perez-Gutierrez

(57) ABSTRACT

A radio which can operate in two separate frequency bands, with size, weight, and cost that is comparable with a conventional unit that can operate in only one frequency band. The radio includes two local oscillators which respectively produce signals at substantially the same frequencies for operation in both frequency bands. By appropriately choosing the frequency of the oscillators' signals, the radio can produce an intermediate signal which has the same frequency when the radio is operating in either band.

12 Claims, 2 Drawing Sheets

DUAL BAND RADIO OR MOBILE PHONE

DUAL BAND MOBILE PHONE USING THE SAME INTERMEDIATE FREQUENCY FOR BOTH BANDS

RELATED APPLICATIONS

This nonprovisional patent application claims a right of priority and the benefit of Provisional Application No. 60/078,987 filed Mar. 23, 1998 entitled "Dual Band Mobile Phone Handset" by Anders Eklof pursuant to 35 U.S.C. §119(e).

FIELD OF THE INVENTION

The present invention involves wireless telecommunications. More specifically, the present invention concerns mobile phone handsets and other radio apparatus that can operate in two or more frequency bands.

BACKGROUND OF THE INVENTION

Certain cellular telephones that exist in the prior art are able to operate on two frequency bands, that is, either around 800 megahertz ("MHz") or around 1900 MHz. (One MHz equals one million cycles per second. 1000 MHz equals one gigahertz.) Established cellular communication networks in the U.S. currently use the 800 to 900 MHz frequency band. The anticipated new PCS ("Personal Communication Services") cellular communication networks in the U.S. will use frequencies in the neighborhood of 1900 MHz. Requirements of these phones, since they are mobile, include that they be small, lightweight, and relatively inexpensive.

In certain prior art systems, dual band operation has required either two band switched local oscillators or three local oscillators in order to perform the up conversion and down conversion associated with superheterodyne operation for both bands. Associated with the multiple oscillator frequencies, multiple filters and mixers complicate the previous dual band designs, causing an increase in the size and cost of these units compared to a single band design.

DETAILED DESCRIPTION OF THE DRAWINGS

Figure 1:
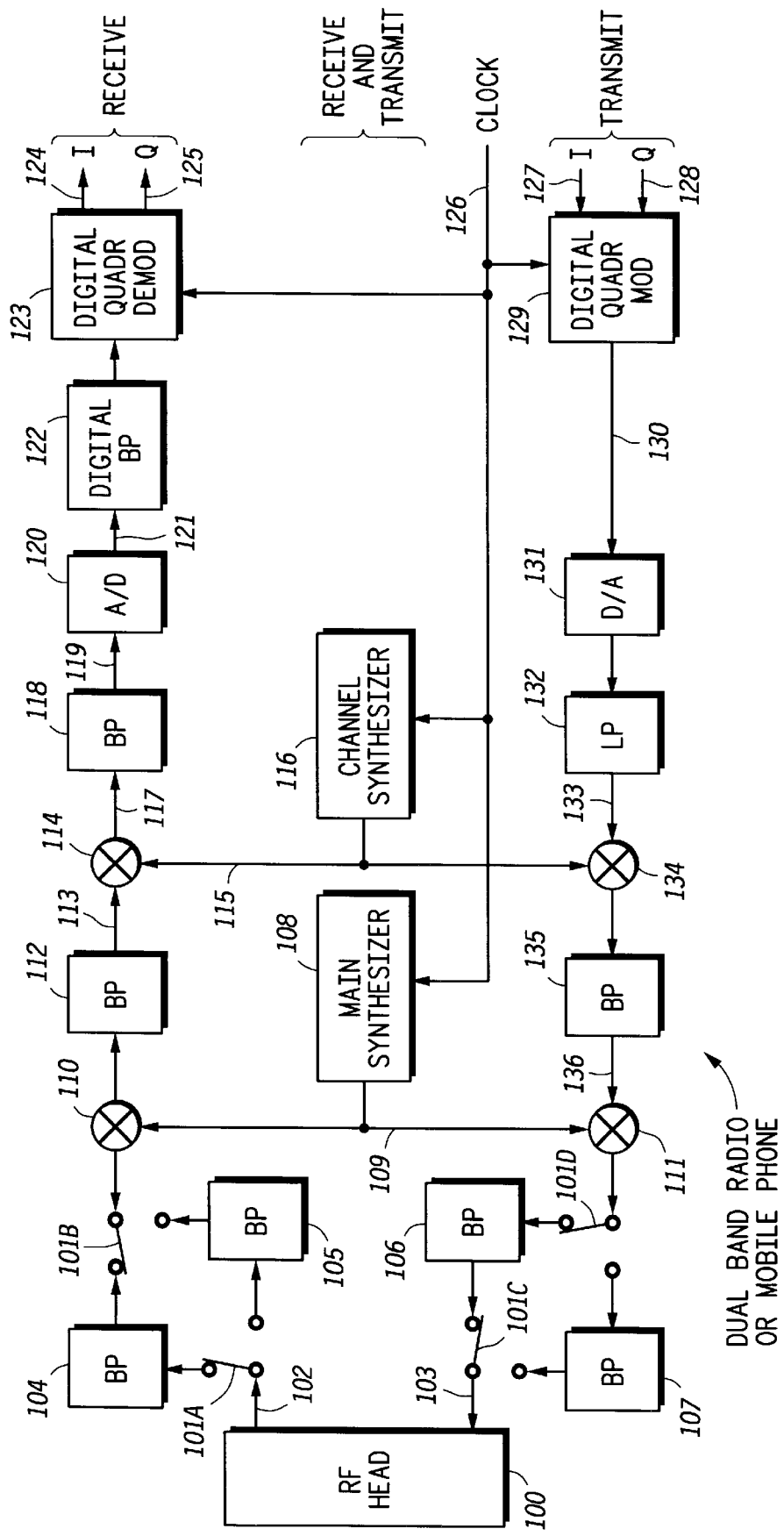
FIG. 1 illustrates a block diagram of a mobile phone radio in accordance with an embodiment of the present invention.

FIG. 1 shows a block diagram of a mobile phone or radio in accordance with a particular embodiment of the present invention.

The upper part of FIG. 1 shows the components of the radio or mobile phone that process the received signals. This includes the circuit paths from components 102, to 110, to 114, to 120, to 123.

The lower part of FIG. 1 shows the transmission signal path, from component 129, to 134, to 111, to 103.

The central area of FIG. 1 shows components used for both sending and receiving signals, including components 100, 108, and 116.

All these components are used for both the 800 MHz band and 1900 MHz band signals.

On the reception circuit, the RF head 100 receives an incoming signal 102 and transmits it to bandpass ("BP") filter 104 or 105, through gang switch 101A. The received signal 102 then passes to mixer 110 through gang switch 101B. Mixer 110 also receives a signal 109 from the main synthesizer 108, and the output of mixer 110 passes to BP filter 112. The output 113 of filter 112 passes to mixer 114, which also receives a signal 115 from the channel synthesizer 116. The output 117 of mixer 114 goes to filter 118. The output of BP filter 118 goes to analog/digital ("A/D") converter 120, which outputs to digital BP filter 122. Digital filter 122 outputs to digital quadrature demodulator 123, which outputs I baseband signal 124 and Q baseband signal 125.

The clock 126 delivers its signal to the digital quadrature demodulator 123 and modulator 129, the channel synthesizer 116, and the main synthesizer 108.

On the transmission circuit the I signal 127 and Q signal 128 input to the digital quadrature modulator 129, which outputs a signal to the digital to analog ("D/A") converter 131. The D/A converter 131 outputs to low pass ("LP") filter 132, which outputs a signal 133 to mixer 134. Mixer 134 also receives a signal 115 from channel synthesizer 116 and outputs a signal to BP filter 135. BP filter 135 outputs a signal 136 to mixer 111. Mixer 111 also receives a signal 109 from main synthesizer 108, and outputs a signal to gang switch 101D. Gang switch 101D switches the signal to BP filters 106 or 107, which pass their output signal 103 by gang switch 101C. The signal 103 then passes to RF head 100 for transmission.

With present technology, some parts in the radio frequency ("RF") head 100 may have to be physically separate and switched in and out of the two bands. One important feature of the illustrated embodiment is that when used in the 800 MHz band, the RF head produces a signal 102 on the receive side that contains energy in the frequency band of 869.04 MHz to 893.97 MHz, and accepts a transmit signal 103 in the 824.04 to 848.97 MHz band. Thus, the frequency of signal 102 on the receive side and the frequency of the transmit signal 103 have a separation $S_1$ between them when the radio operates in the 800 MHz band. When used in the 1,900 MHz band, the received signals 102 fall in the 1,930.08 MHz to 1,990.08 MHz range, and the transmit input 103 falls in the 1,850.04 MHz to 1,910.04 MHz range. Thus, the frequency of received signals 102 and the frequency of the transmit input 103 have a separation $S_2$ between them when the radio operates in the 1,900 MHz band.

Bandpass filters 104–107 are SAW filters designed to pass only the required frequency bands stated above. Filter 104 passes frequencies in the 869.04 to 893.97 MHz range, and rejects frequencies outside this band, while the corresponding passing frequencies for filters 105–107 are 1,930.08–1, 990.08 MHz, 824.04–848.97 MHz and 1,850.04–1,910.04 MHz, respectively.

The filters 104–107 are switched into and out of the circuit as required by gang switches 101A, 101B, 101D and 101C, respectively. Down conversion mixer 110 is therefore given an RF input signal in either the range of 869.04–893.97 MHz, or the range of 1,930.08–1,990.08 MHz. The other input to mixer 110 is signal 109 from main synthesizer 108. The frequency of signal 109 can be varied in steps of 2.16 MHz with a lowest frequency of 1,337.04 MHz and a highest frequency of 1,395.36 MHz. The frequency of signal 109 which is output from main synthesizer 108 is the same for operation in both the 800 and 1,900 MHz bands. The mixer 110 generates two mixing product bands: one at the sum of the two input frequencies and another at the difference between the two input frequencies.

In the case of the 800 MHz band, the sum is around 2.1 GHz and will be rejected by subsequent filter 112. The difference is around 500 MHz, and a portion of it is passed by filter 112. Filter 112 is electrically tuneable so that it has a center frequency set to either 467 MHz or 592 MHz. For the 800 MHz band, the 467 MHz center frequency is used. Filter 112 has a bandwidth sufficient to allow any channel in a 2.16 MHz increment of frequency on either side of the center frequency to be passed without significant attenuation or phase distortion. The main synthesizer 108 is tuned to keep the desired receive channel within 2.16 MHz of the center frequency of filter 112. When the lowest frequency channel in the 800 MHz band is being received, the frequency of it on the output mixer 110 is shifted down to 468 MHz (1,337.04−869.04 MHz=468.00 MHz).

When the 1,900 MHz band is used, the lowest frequency receive channel is at 1,930.08 MHz. The sum frequency from mixer 110 is more than 3 GHz, and thus, easily rejected by filter 112. The difference frequency is at 593.04 MHz (1,930.08−1,337.04 MHz=593.04 MHz) which falls in the pass band of the second frequency to which filter 112 can be electrically tuned.

The output 113 of filter 112 is a band of energy centered at 467 or 592 MHz. The second down converter mixer 114 mixes (i.e., adds and subtracts) output 113 with signal 115 from channel synthesizer 116. Signal 115 can be tuned in channel spacing increments to either side of its center frequency, which is 530.52 MHz. As discussed above, the lowest channel in the 800 MHz band appears at 468.00 MHz in signal 113 and at 593.04 MHz for the 1,900 MHz band. When mixed with the 530.52 MHz signal from channel synthesizer 116, both these frequencies cause a mixing product of 62.52 MHz on the output 117 of mixer 114. For both the 800 MHz and 1,900 MHz bands, the mixer also outputs a signal at about 1 GHz, but this component is filtered out by filter 118. Thus, the lowest frequency channel in both the 800 and 1,900 MHz bands both produce a filtered IF signal 119 with a frequency of 62.52 MHz, even though both the main synthesizer 108 and channel synthesizer 116 are at the same frequencies in the 800 and 1,900 MHz band. This result is obtained by placing the main synthesizer output halfway between transmission frequency for the lowest frequency channel in the 800 and 1,900 MHz bands (i.e., halfway between 824.04 MHz and 1,850.04 MHz), and then tuning the channel synthesizer 116 to halfway between the two different frequencies of signal 113 generated for the two bands, making the second receive IF frequency of 62.52 MHz exactly half the difference between the two frequencies of signal 113.

In the transmit direction, the lowest frequency channel is a 824.04 MHz for the 800 MHz band and 1,850.04 MHz for the 1,900 MHz band. Accordingly, the separation $S_1$ between the frequencies of the received and transmitted signals for radio operation in the lowest frequency channel in the 800 MHz band is 45 MHz (869.04−824.04=45 MHz). The separation $S_2$ between the frequencies of the received and transmitted signals for radio operation in the lowest frequency channel in the 1,900 MHz band is 80.04 MHz (1,930.08−1,850.04 MHz). The channel frequency allocations for the two bands maintain the $S_1$ and $S_2$ frequency separation respectively between the transmit and receive channels for all channels.

The sum of $S_1$ and $S_2$ is 125.04 MHz, which is also the difference between the 468.00 MHz intermediate frequency IF for the 800 MHz band and the 543.04 MHz IF for the 1900 MHz band. (i.e., 593.04 MHz−468.00 MHz=125.04 MHz)

Mixer 111 has as one of its inputs the signal 109, which is tuned to 1,337.04 MHz in order for the radio to operate at the lowest 2.16 MHz frequency slice of either the 800 or the 1,900 MHz band. Both of the two desired transmit frequencies are generated by mixing signal 109 with signal 136, which is at 513.00 MHz for the lowest frequency channel in any 2.16 MHz slice. By using switches 101C, 101D and SAW band pass filters 106 or 107, either the 800 MHz or the 1,900 MHz band is selected.

The 513.00 MHz frequency of signal 136 is generated by mixer 134, which receives signal 115 as one of its inputs. For the lowest frequency channel in either band, signal 115 is at 530.52 MHz. This requires signal 133 to be at 17.52 MHz, and bandpass filter 135 to pass 513.00 MHz but reject 547 MHz (530.04+17.52=547.56 MHz). A SAW filter meets these requirements and thus is incorporated into the present embodiment.

The frequency of signal 133 is fixed at 17.52 MHz for both the 800 and 1,900 MHz bands. To tune in channel increments, the channel synthesizer is used to increase or decrease the frequency of signal 115 from 530.52 MHz. For example, for the 800 MHz band, tuning to a channel of a higher frequency involves tuning the channel synthesizer down in frequency. Tuning to a channel of a higher frequency in the 1,900 MHz band, on the other hand, involves tuning the channel synthesizer up in frequency.

Since the main synthesizer 108 tunes in 2.16 MHz steps, the channel synthesizer 116 needs to tune only over a range of +/−(2.16 MHz minus the channel spacing). Thus, both synthesizers have a simple structure. For example, the main synthesizer is required to have only 27 tuning steps, and the channel synthesizer is required to only have 142 steps for a 30 kHz channel spacing.

The receive side channel filter 118 is designed to optimally filter the desired channel before the signal is converted to digital format by A/D converter 120. Signal 119 is centered at 62.52 MHz and subsampled by the A/D converter 120. The digital output signal 121 from the AID converter 120 generates a spectrum of channel wide energy bands, separated by the sampling rate for the A/D converter 120. A digital bandpass filter 122 is used to extract the lowest frequency band in this spectrum for demodulation by digital demodulator 123. The outputs from digital demodulator 123 are the I and Q baseband signals 124 and 125.

Clock signal 126 is used to digitally drive tuneable synthesizers 108 and 116, digital demodulator 123 and digital modulator 129. The D/A converter 131 generates an analog version 133 of the digitally generated and modulated transmit carrier 130, which has a frequency of 17.52 MHz. Signal 130 has four samples per carrier cycle so that the conversion rate for D/A converter 131 is 70.08 MHz. Low pass filter 132 eliminates the harmonics and sampling rate multiples of the signal.

Figure 2:
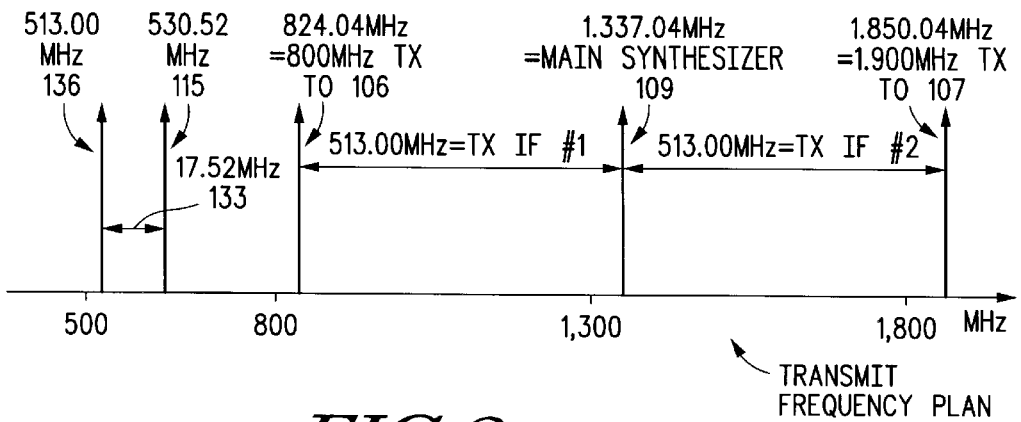
FIG. 2 illustrates a transmit frequency plan in accordance with an embodiment of the present invention.
Figure 3:
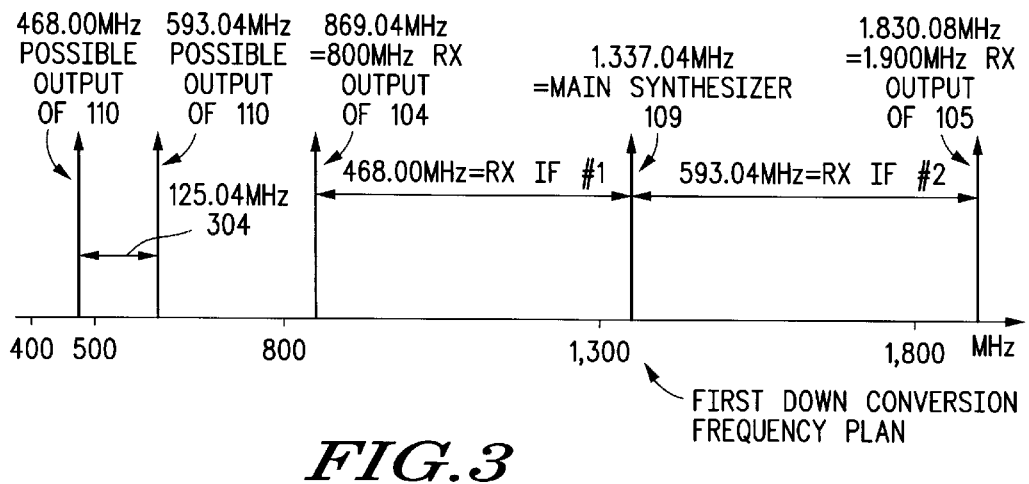
FIG. 3 illustrates a first down conversion plan in accordance with an embodiment of the present invention.
Figure 4:
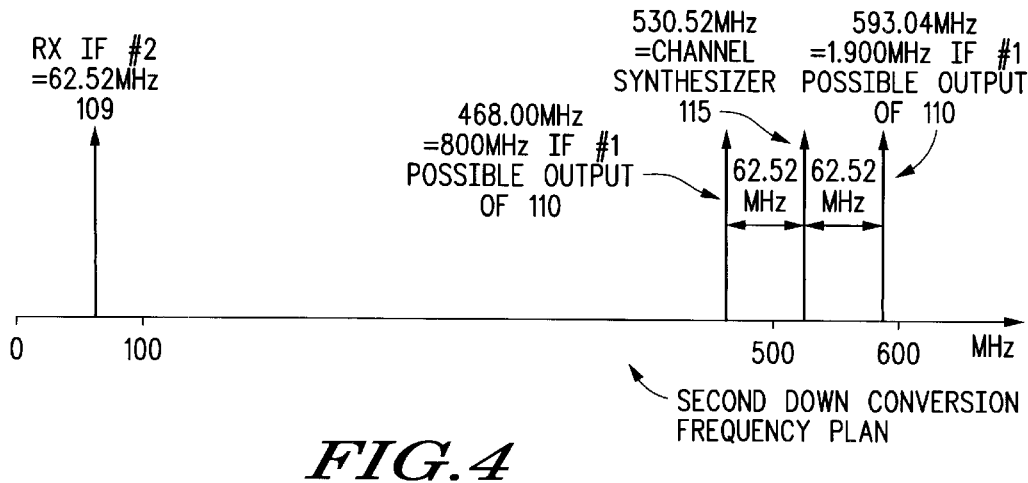
FIG. 4 illustrates a second down conversion plan in accordance with an embodiment of the present invention.

FIGS. 2, 3, and 4 show frequency plans. The horizontal axis represents the frequency spectrum. The frequencies used by selected components shown in FIG. 1 are shown on the horizontal axis. (The vertical dimension in FIGS. 2, 3 and 4 does not correlate to any factor.)

FIG. 2 shows a transmit side frequency plan. The frequencies generated by the main and channel synthesizers have no harmonics that fall in the band on either the transmit or the receive side. The 513 MHz second IF on the transmit side does not have such harmonics. The 17.52 MHz first transmit IF has no harmonics that are in the band of the receive side channel filter at 62.52 MHz.

As discussed above and shown in FIG. 2, the frequency of the signal 109 output from main synthesizer 108 is halfway between the desired transmit frequencies for the 800 MHz and 1,900 MHz bands. Specifically, for the lowest channel in each band, the signal 109 has a frequency of 1,337.04 MHz which is halfway between the transmit frequency 824.04 MHz for the 800 MHz band and the transmit frequency 1,850.04 MHz for the 1,900 MHz band. Thus, the signal 136 input to mixer 111 must be the same (i.e., 513.00 MHz) for both of the 800 MHz and 1,900 MHz bands. This frequency selection is accomplished by bandpass filter 135 (see FIG. 1). Since the signal 115 from the channel synthesizer 116 is set at 530.52 MHz and a 513.00 MHz output is required from mixer 134, signal 133 input to mixer 134 must be set to a value of 17.52 MHz which is equal to $(S_1-S_2)/2$, (i.e., (45−80.04)/2).

FIG. 3 shows the frequency plan for the first down conversion in the receive side. This down conversion is performed by mixer 110. As discussed above, when signal 109 having a frequency of 1,337.04 MHz is mixed with a signal having a frequency of 869.04 MHz for the 800 MHz band or a frequency having 1,930.08 MHz for the 1,900 MHz band, an output of 468.00 MHz (for the 800 MHz band) or 593.04 MHz (for the 1,900 MHz band) results. The difference in these possible outputs (i.e., 593.04−468.00 MHz=125.04 MHz) is equal to the sum of the separations $S_1$ and $S_2$ between transmit and receive frequencies in the lowest frequency channel for the 800 and 1,900 MHz bands, respectively.

FIG. 4 shows the frequency plan for the second down conversion on the receive side. This second down conversion is performed by mixer 114 (see FIG. 1). The signal 115 from the channel synthesizer 116 has a frequency which is halfway between the 468 MHz signal (for the 800 MHz band) and the 593.04 MHz signal (for the 1,900 MHz band) originating from mixer 110 to thereby produce an output of 62.52 MHz for either the 800 MHz or the 1,900 MHz band. Thus, the same frequency is output from mixer 114 regardless of which band the radio operates on.

The present description and its embodiments discusses both wireless mobile phones and radio apparatus. Mobile phones may be viewed as radio apparatus, but radio and wireless data transmission equipment not considered to be telephony equipment may also use the present invention. Likewise, the present description discusses the 800 MHz and 1900 MHz frequency bands, but the present invention may also use other telecommunication frequencies.

The illustrative embodiments can also operate in a receive-only embodiment on two or more frequency bands, with none of the transmission-only components indicated in FIG. 1. Likewise, the illustrated embodiments can operate in a transmit-only embodiment, on two or more frequency bands, with none of the reception-only components shown in FIG. 1.

Although particular embodiments of the present invention have been disclosed for illustrative purposes, those skilled in the art will appreciate that various modification, additions, and substitutes are possible without departing from the scope and spirit of the invention as disclosed in the accompanying claims.

What is claimed is:

1. A method for operating a dual band radio in first and second frequency bands, said method comprising:

receiving a carrier signal using a receiver, said receiver carrier signal being centered around a frequency $f_{1r}$ when said radio operates in said first frequency band and a frequency $f_{2r}$ when said radio operates in said second frequency band;

transmitting a carrier signal using a transmitter, said transmitter carrier signal being centered around a frequency $f_{1t}$ when said radio operates in said first frequency band and a frequency $f_{2t}$ when said radio operates in said second frequency band to thereby form a first frequency separation $S_1$ between the frequencies $f_{1t}$ and $f_{1r}$ when said radio operates in said first frequency band and a second frequency separation $S_2$ between the frequencies $f_{2t}$ and $f_{2r}$ when said radio operates in said second frequency band;

providing a first oscillator signal having a first frequency to both said receiver and said transmitter; and providing a second oscillator signal having a second frequency to both said receiver and said transmitter;

wherein said first frequency of said first oscillator signal is set to $(f_{1t}+f_{2t})/2$ so that said receiver produces a first reception intermediate signal having a first frequency when said radio operates in said first frequency band and a second frequency when said radio operates in said second frequency band, and said first and second frequencies of said first reception intermediate signal differ by $S_1+S_2$.

2. A dual band radio capable of operating in separate first and second frequency bands, said dual band radio comprising:

a reception circuit for accepting a received carrier signal;

a transmission circuit for providing a transmit carrier signal;

a first oscillator inputting a first oscillator signal having a first frequency to both said reception circuit and said transmission circuit; and a second oscillator inputting a second oscillator signal having a second frequency to both said reception circuit and said transmission circuit;

wherein said reception circuit produces an intermediate signal which has the same frequency when the radio operates in either of said first or second frequency bands, and wherein said received carrier signal is centered around a frequency $f_{1r}$ when said radio operates in said first frequency band and a frequency $f_{2r}$ when said radio operates in said second frequency band;

said transmit carrier signal is centered around a frequency $f_{1t}$ when said radio operates in said first frequency band and a frequency $f_{2t}$ when said radio operates in said second frequency band to thereby form a first frequency separation $S_1$ between the frequencies $f_{1t}$ and $f_{1r}$ when said radio operates in said first frequency band and a second frequency separation $S_2$ between the frequencies $f_{2t}$ and $f_{2r}$ when said radio operates in said second frequency band; and wherein said first frequency of said first oscillator signal is set to $(f_{1t}+f_{2t})/2$.

3. A dual band mobile phone capable of operating in separate first and second frequency bands, said dual band mobile phone comprising:

a reception circuit for accepting a received carrier signal;

a transmission circuit for providing a transmit carrier signal;

a first oscillator inputting a first oscillator signal having a first frequency to both said reception circuit and said transmission circuit; and a second oscillator inputting a second oscillator signal having a second frequency to both said reception circuit and said transmission circuit;

wherein said reception circuit produces an intermediate signal which has the same frequency when the mobile phone operates in either of said first or second frequency bands;

said received carrier signal being centered around a frequency $f_{1r}$ when said mobile phone operates in said first frequency band and a frequency $f_{2r}$ when said mobile phone operates in said second frequency band;

said transmit carrier signal being centered around a frequency $f_{1t}$ when said mobile phone operates in said first frequency band and a frequency $f_{2t}$ when said mobile phone operates in said second frequency band to thereby form a first frequency separation $S_1$ between the frequencies $f_{1t}$ and $f_{1r}$ when said mobile phone operates in said first frequency band and a second frequency separation $S_2$ between the frequencies $f_{2t}$ and $f_{2r}$ when said mobile phone operates in said second frequency band; and said first frequency of said first oscillator signal is set to $(f_{1t}+f_{2t})/2$.

4. The dual band mobile phone as claimed in claim 3, wherein said second frequency of said second oscillator signal is set so that said intermediate signal has a frequency equal to $(S_1+S_2)/2$.

5. A mobile phone comprising:

a signal reception circuit for accepting a received carrier signal;

a signal transmission circuit for providing a transmit carrier signal;

a first oscillator for inputting a first oscillator signal with a first oscillator frequency to said signal reception circuit and said signal transmission circuit; and a second oscillator for inputting a second oscillator signal with a second oscillator frequency to said signal reception circuit and said signal transmission circuit; wherein said mobile phone is capable of operating in first and second frequency bands, said first and second frequency bands being separate from each other and said first frequency of said first oscillator signal is the same for mobile phone operation in either of said first and second frequency bands; and wherein said first frequency of said first oscillator signal is tuneable over a first range; and said second frequency of said second oscillator signal is tuneable over a second range, said second range being narrower than said first range.

6. A radio comprising:

a signal reception circuit for accepting a received carrier signal;

a signal transmission circuit for providing a transmit carrier signal;

a first oscillator for inputting a first oscillator signal with a first frequency to said signal reception circuit and said signal transmission circuit; and a second oscillator for inputting a second oscillator signal with a second frequency to said signal reception circuit and said signal transmission circuit; wherein said radio is capable of operating in first and second frequency bands, said first and second frequency bands being separate from each other;

said first frequency of said first oscillator signal is the same for radio operation in either of said first and second frequency bands; and said second frequency of said second oscillator signal is substantially the same for radio operation in either of said first and second frequency bands.

7. The radio as claimed in claim 6, wherein said signal reception circuit includes first and second down conversion mixers to receive said first and second oscillator signals, respectively; and said signal transmission circuit includes first and second up conversion mixers to receive said first and second oscillator signals, respectively.

8. The radio as claimed in claim 7, wherein said signal transmission circuit includes first and second filters respectively connected to said first and second up conversion mixers; and said signal reception circuit includes first and second filters respectively connected to said first and second down conversion mixers.

9. The radio as claimed in claim 8, wherein said received carrier signal is centered around a frequency $f_{1r}$ when said radio operates in said first frequency band and a frequency $f_{2r}$ when said radio operates in said second frequency band;

said transmit carrier signal is centered around a frequency $f_{1t}$ when said radio operates in said first frequency band and a frequency $f_{2t}$ when said radio operates in said second frequency band, to thereby form a first frequency separation $S_1$ between the frequencies $f_{1t}$ and $f_{1r}$ in said first frequency band and a second frequency separation $S_2$ between the frequencies $f_{2t}$ and $f_{2r}$ in said second frequency band;

said first frequency of said first oscillator signal is set to $(f_{1t}+f_{2t})/2$ so that said reception circuit produces a first reception intermediate signal having a first frequency when said radio operates in said first frequency band and a second frequency when said radio operates in said second frequency band; and said first and second frequencies of said first reception intermediate signal differ by $S_1+S_2$.

10. The radio as in claim 9, wherein said second oscillator frequency is tuned to have a frequency halfway between said first and second frequencies of said first reception intermediate signal so that said reception circuit produces a second reception intermediate signal having a frequency equal to $(S_1+S_2)/2$ when said radio operates in said first frequency band or said second frequency band.

11. The radio as in claim 6, wherein said transmit carrier signal is centered around a frequency $f_{1t}$ when said radio operates in said first frequency band and a frequency $f_{2t}$ when said radio operates in said second frequency band; and said first frequency of said first oscillator signal is between $f_{1t}$ and $f_{2t}$; wherein said first frequency of said first oscillator signal is equal to $(f_{1t}+f_{2t})/2$.

12. The radio as claimed in claim 6, wherein said first frequency of said first oscillator signal is tuneable over a first range; and said second frequency of said second oscillator signal is tuneable over a second range, said second range being narrower than said first range.

* * * * *